2,805,262
PROCESS FOR ETHER PURIFICATION

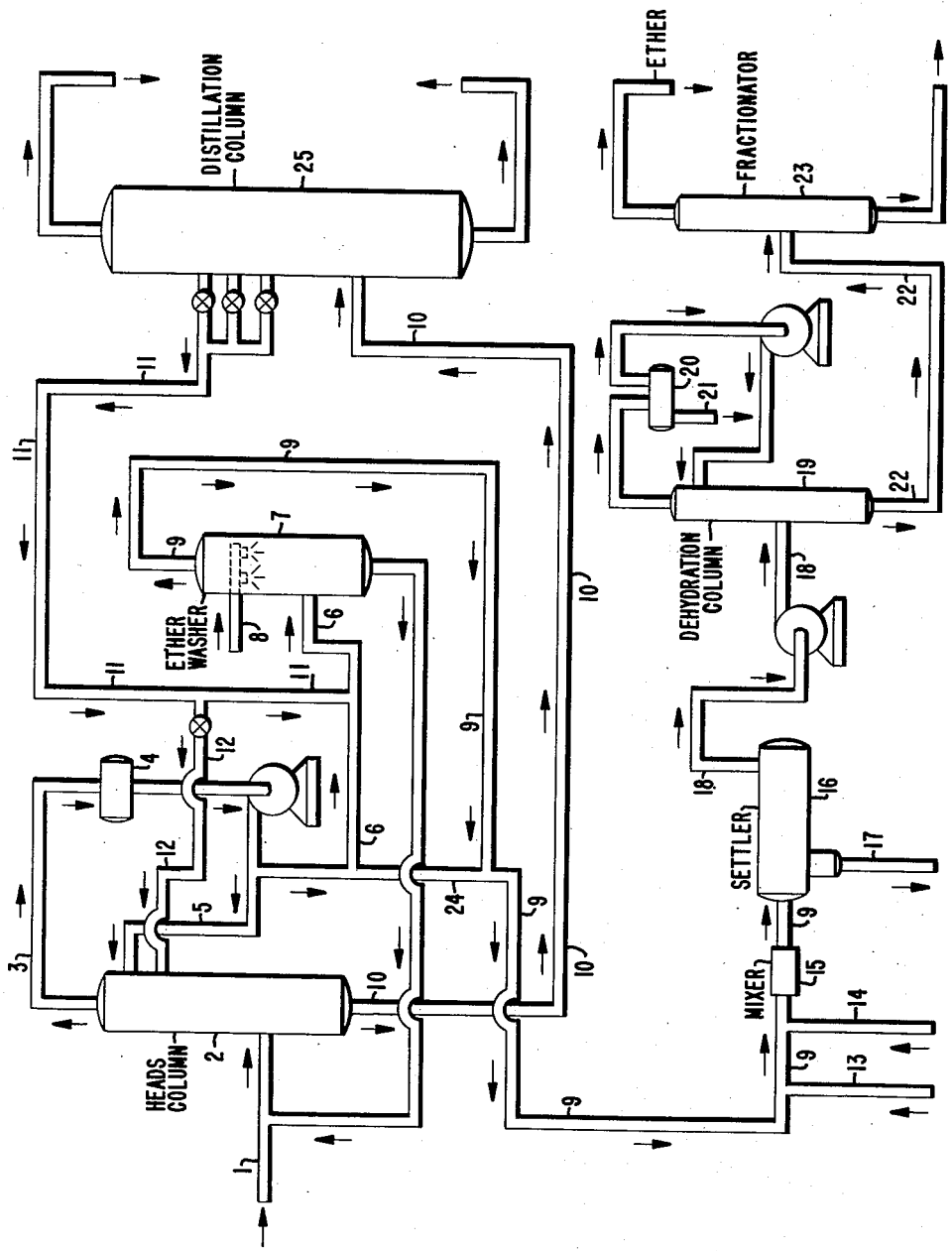

Elaine T. Delaune, Samuel W. Wilson, and Samuel J. Mayeux, Jr., Baton Rouge, La., assignors to Esso Research and Engineering Company, a corporation of Delaware Application March 10, 1955, Serial No. 493,484

5 Claims. (Cl. 260—616)

The present invention relates to a method of purifying a crude volatile aliphatic ether such as a crude ethyl or isopropyl ether prepared by the reaction of an olefin with sulfuric acid. More particularly, the present invention relates to a process for upgrading an aliphatic ether by removing objectionable odors therefrom and producing a high quality product suitable for industrial, reagent and pharmaceutical purposes.

High grades of chemically pure, anhydrous, and reagent grade ethyl ethers have been manufactured in the past on a small scale for use as laboratory agents or special solvents. To obtain the required high degree of purity required for these grades, it was generally considered necessary that the ether be produced by a reaction of rather pure ethanol and sulfuric acid followed by lengthy steps of washing, neutralizing, and redistilling. Involved purification treatments were required for removal of impurities such as aldehydes, free acid, peroxides, odor and color forming substances and the like.

In the development of alcohol syntheses from olefins on a large scale, large amounts of crude ether by-products have become available, leading to the necessity of refining the crude ethers on a large industrial scale in order to obtain commercially saleable and high grade ether products.

In particular, it is necessary to remove foreign odors for these make even otherwise high quality ethers unsuitable for many purposes, such as in pharmaceuticals and the like. These odor-imparting constituents are present in apparently very small concentrations, but are very difficult to remove by treating techniques generally employed in improving the odor of organic materials. Thus, percolation of finished ether through various solid absorbents such as charcoal, silica gel, sand, or alumina gave no significant improvement in the odor. Even with exceptionally high fractionation efficiency in the final distillation step, complete odor removal was not realized. A similar result was obtained by employment of treating agents such as $H_2SO_4$, water, KOH, $KMnO_4$ and the like. It is thus evident that the ether odor problem is an important and difficult one.

An object of the present invention is to provide a method of purification that will produce a finished ether product of high purity substantially free of foreign odors.

A further object of the present invention is to provide an economical ether purification treatment which is adapted for use in combination with a large scale distillation refining on a continuous basis with avoidance of time- and material-consuming steps.

Other objects and advantages of this invention will be made apparent in the following description.

In accordance with the present invention, diethyl ether produced by the sulfation of ethylene is improved with respect to odor by maintaining a small amount of ethyl alcohol in the ether, or by adding a small amount of ethyl alcohol to the ether, to maintain an alcohol content of not less than 0.5 volume percent, and preferably 1%, and preferably no more than about 10%, and contacting this solution with a solution of sodium plumbite, and thereafter distilling the treated ether. The sodium plumbite treated ether after distillation is vastly improved as to odor as compared to the same ether not so treated but distilled, or treated by reagents set forth above, such as $H_2SO_4$, $NaHSO_3$, etc.

A satisfactory procedure by which the invention is practiced is described in reference to the accompanying drawing, which is a schematic flow plan of a continuous ether refining system for illustrating preferred embodiments of the invention.

Turning now to the figure, crude ethanol which is made by reacting ethylene with sulfuric acid, followed by hydrolysis and stripping and water dilution to effect separation of high boiling water-insoluble contaminants or in a manner known to the art, is fed via line 1 to the ether or heads column 2. In this distillation column, conditions are maintained such that ether, alcohol and water are taken overhead. Some water-insoluble impurities may also be removed in the overhead stream. Crude ether containing from 0.5–40% (vol.) of alcohol is taken off overhead via line 3 and condenser 4 and is returned in part as reflux to column 2 via line 5. Tower 2 may be operated to take overhead more than 1–2% alcohol; in such case a portion of the overhead is sent to ether washer 7 via line 6. Water is added to ether washer 7 through line 8, and a temperature of 75–85° F. and a pressure sufficient to keep the ether in the liquid phase are maintained. The washed ether containing a small amount of alcohol, generally less than 1% by volume, is taken overhead or as the top phase and is sent via line 9 to the ether purification unit of the invention. This crude washed ether may contain as impurities varying amounts of high boiling materials, low boiling impurities, sulfur compounds, organic acids, and the like.

The ether-free bottoms from column 2 are passed via line 10 to rectifying column 25 for alcohol recovery, purification, and concentration. Side streams may be withdrawn from column 25 via line 11 and passed to ether washer 7 via line 6, where high boilers are extracted by the ether as water-insoluble impurities. All or a portion of the side streams may also be returned to heads column 2 via lines 11 and 12.

If the heads, or ether column 2 is operated to take overhead ether containing 0.5 vol. percent or less of alcohol, the ether stream may by-pass ether washer 7 and flow directly to the purification system via line 24.

In the ether purification section the crude ether is admixed, if necessary, with additional quantities of ethanol introduced via line 13 to bring the total ethanol content to at least 0.5 vol. percent and preferably about 1%. The ether-ethanol mixture is then passed to mixer 15 wherein it is contacted and thoroughly mixed with sodium plumbite solution introduced via line 14. About 1 hour contact time is usually satisfactory.

After mixing, which may be by means of a centrifugal pump, agitator or other known means, the mixture is passed for settling to vessel 16, where, upon stratification of the layers, the sodium plumbite solution may be drawn off via line 17 for recycle until the active purifying agent is spent.

The treated ether is passed via line 18 for finishing. It is passed to dehydration column 19 where water is removed by condensing, cooling, and decantation in condenser-accumulator 20. Water is discarded via line 21.

The crude dehydrated ether containing possibly some high boiling impurities is now passed to fractionator 23 where high boiling impurities are taken as bottoms and high purity finished ether as overhead.

The purification steps which have been described with reference mainly to diethyl ether are applicable to simple and mixed dialkyl ethers containing from 4 to 6 carbon atoms per molecule. Also, though the invention has been described in connection with ethers prepared by absorption of olefins in $H_2SO_4$, it may also be employed in purifying ethers prepared by other means, such as by direct hydration of olefins. As for the ether purifying reagent, NaOH may be replaced by other alkalis such as KOH, $Na_2CO_3$, $K_2CO_3$, etc.

The process of the present invention may be further illustrated by the following specific examples. In the examples, the sodium plumbite treating agent was prepared by saturating 11 wt. percent caustic solution with 1.5% lead oxide. This solution, containing about 3% sodium plumbite, was diluted with varying amounts of water; in the examples, the strength of the solution used is expressed as weight percent sodium plumbite.

By "odor class," reference is had to an arbitrary scale for measuring and comparing odor of ethyl ether. The odor of ethyl ether is so intense that little foreign odors can be detected until the ether has fairly well evaporated and foreign odors have become concentrated. In the scale, class 3 designates an ether having no detectable foreign odor, and class 12 an ether having strongly objectionable odors. The ascending numbers correspond to increasing amounts of these objectionable odors.

Example 1

In the laboratory experiments below, crude ether from the distillation section was shaken with the plumbite solution in a separatory funnel. The water layer was then removed and the ether distilled. Crude ether was treated with 10 volume percent of the solutions shown and then distilled using 5–30 plates and reflux ratios of 1/1 to 10/1.

| Treatment | No Ethanol | | 1 vol. percent Ethanol added to Crude | | | | | |
|---|---|---|---|---|---|---|---|---|
| | Blank | 0.5% Sodium Plumbite soln. | Blank | 0.5% Sodium Plumbite | | | | |
| | | | | 1st use | 2nd use | 3rd use | 4th use | 5th use |
| No. Plates | 30 | 30 | 30 | 30 | 5 | 5 | 12 | 5 |
| Reflux Ratio | 5/1 | 5/1 | 5/1 | 5/1 | 5/1 | 5/1 | 1/1 | 1/1 |
| Odor Class of 90% Overhead | 8 | 6 | 6 | 3 | 3 | 3 | 3 | 5 |

These results show the marked improvement of the ether odor when treated in accordance with the process of the present invention. They further show the necessity of maintaining a definite amount of ethanol in the ether. The ethanol probably acts as a mutual solvent, though the mutual solvent effect does not alone account for its necessity. Other mutual solvents, such as isopropanol, are not effective.

Example 2

In another set of laboratory runs, the effect of 2% ethanol in the ether to be treated was determined.

| | 2 vol. percent Ethanol Added | No Ethanol Added |
|---|---|---|
| Treatment | Blank | Treated | Treated |
| Odor Class | 8 | 4 | 8 |

Here it is seen that no improvement at all was obtained on treating ethanol-free ether with 10 volume percent sodium plumbite in the absence of ethanol.

Example 3

The superiority of the plumbite solution over other odor improving reagents is shown by the following data. Crude ether was treated with 10 volume percent of the solution shown. The treated ether was then distilled using 30 plates and a 5/1 reflux ratio. The range of odor ratings of the various cuts is shown. An asterisk indicates that 1% alcohol was added.

| 10% Cuts | Blank | Water | 10% KOH | 15% KOH | 46% KOH | 10% NaOH |
|---|---|---|---|---|---|---|
| 1–3 | 6–8 | 8–10 | 6 | 3–6 | 8–10 | 6–8 |
| 4–6 | 5 | 6–8 | 3 | 3 | 3 | 3 |
| 7–9 | 7–10 | 3–6 | 3–6 | 3 | 3–8 | 6–8 |

| 10% Cuts | 30% NaOH | 10% NaHSO$_3$ | 10% KMnO$_4$ | 65% Sulfuric Acid | | 2% Plumbite (no alcohol) |
|---|---|---|---|---|---|---|
| | | | | Black | White | |
| 1–3 | 8 | 8 | 8–10 | 6–8 | 8–10 | 3–8 |
| 4–6 | 6 | 6–8 | 8 | 4–6 | 3–8 | 3–4 |
| 7–9 | 6–8 | 6–8 | 8 | 3–6 | 6 | 4–6 |

| 10% Cuts | Blank | Water* | 10% KOH* | 0.5% Plumbite (1% Ethanol) |
|---|---|---|---|---|
| 1–3 | 6–8 | 10–12 | 3–6 | 3 |
| 4–6 | 3–6 | 6 | 3 | 3 |
| 7–9 | 3–6 | 6 | 8–10 | 3 |

Example 4

Sodium plumbite has been used to "sweeten" sour gasolines, i. e. those containing small amounts of sulfur. That in the case of the present process a "sweetening" does not occur is shown by the following data wherein the effect of sodium hypochlorite, a well-known "sweetening" agent, is applied to the crude ether. In this example, the ether is treated with 2 volume percent of alkaline hypochlorite with and without added ethanol. It will be noted that no improvement took place.

| 10% Cuts | Blank | 5 Wt. Percent NaOCl, 2 Wt. Percent NaOH | 5.2 Wt. Percent NaOCl, 2 Wt. Percent NaOH (1% ETOH added to Ether) | 2 Wt. Percent NaOCl, 2 Wt. Percent NaOH | 2 Wt. Percent NaOCl, 2 Wt. Percent NaOH (1% ETOH added to Ether) |
|---|---|---|---|---|---|
| 1–3 | 8–10 | 8–10 | 8–10 | 8–10 | 8–10 |
| 4–6 | 8 | 8 | 8 | 8 | 8 |
| 7–9 | 6–8 | 8–12 | 8–10 | 8 | 8 |

Example 5

Previous Examples 1 and 2 have shown the necessity of maintaining a low molecular weight alcohol, and particularly ethanol, in the treating stage. Data below show that this alcohol preferably is methyl or ethyl; isopropanol apparently is not effective. Primary alcohols are preferred for this service.

| Blank | No Alcohol+ Plumbite | 1% ETOH+ Plumbite | 1% MeOH+ Plumbite | 1% IPOH+ Plumbite | 0.2% "Santomerse" Plumbite | 5% ETOH+ Plumbite |
|---|---|---|---|---|---|---|
| 8 | 6 | 3 | 3 | 6 | 8 | 3 |

These data also shows that the effect of the alcohol is not that merely of acting as a mutual solvent to provide intimate contact. "Santomerse" a commercial wetting agent, was added to determine if intimacy of contact was responsible for the good effects observed with ethanol. No effect of any kind was observed. Furthermore, isopropanol, also a mutual solvent, is ineffective.

What is claimed is:

1. An improved process for purifying a crude alkyl ether contaminated with foreign odor-imparting contaminants which comprises contacting said ether in the presence of a primary alcohol with a solution of an alkali plumbite, said alcohol and alkali plumbite being present in an amount sufficient to substantially free the ether from said foreign odors and thereafter distilling said treated ether.

2. An improved process for purifying crude alkyl ether contaminated with foreign odor-imparting impurities which comprises contacting said ether with an aqueous solution of sodium plumbite in the presence of a minor amount of an alcohol selected from the class of methanol and ethanol, said alcohol and sodium plumbite being present in an amount sufficient to substantially free the ether from said foreign odors distilling said treated ether and recovering a purified ether product.

3. An improved process for purifying diethyl ether contaminated with foreign odor-imparting contaminants which comprises contacting said ether in a treating zone with an aqueous solution of sodium plumbite in the further presence of from about 0.5 to about 10% by volume of ethyl alcohol and distilling said treated ether.

4. The process of claim 3 wherein said alcohol is present to the extent of about 1–2% by volume of ether in said treating zone.

5. The process of claim 3 wherein said ether is treated with a 0.5–10% aqueous solution of sodium plumbite.

References Cited in the file of this patent

UNITED STATES PATENTS

| | | |
|---|---|---|
| 2,053,439 | Nitardy | Sept. 8, 1936 |
| 2,121,019 | Christiansen et al. | June 21, 1938 |
| 2,178,742 | Drapeau | Nov. 7, 1939 |
| 2,179,092 | Ipatieff | Nov. 7, 1939 |
| 2,370,819 | Staid et al. | Mar. 6, 1945 |
| 2,380,524 | Hillyer | July 31, 1945 |